May 27, 1969

G. R. SEVERANCE 3,446,043

SPEED CONTROL FOR A LAUNDRY MACHINE

Original Filed March 2, 1964

INVENTOR.
Glen R. Severance

United States Patent Office 3,446,043
Patented May 27, 1969

3,446,043
SPEED CONTROL FOR A LAUNDRY MACHINE
Glen R. Severance, Benton Harbor, Mich., assignor to Whirlpool Corporation, Benton Harbor, Mich., a corporation of Delaware
Original application Mar. 2, 1964, Ser. No. 348,459. Divided and this application Apr. 8, 1966, Ser. No. 559,020
Int. Cl. D06f 33/02
U.S. Cl. 68—12                          22 Claims

ABSTRACT OF THE DISCLOSURE

A laundry machine having a receptacle adapted for rotation at a low speed to wash clothes therein and at a high speed to centrifugally extract water from the clothes after completion of the wash cycle. The laundry machine includes a support for journaling the receptacle and balancing means connected to the support and cooperable with balance pockets formed along the periphery of the receptacle. Water is supplied to the balance pockets in response to the vibration of the balancing means due to the unbalanced condition of the clothes within the receptacle. A direct current motor is coupled to the receptacle to rotate the receptacle at any desired speed. The control of the direct current motor is accomplished by a motor control circuit which includes rectifier means operative to convert the input alternating current voltage to a direct current voltage. Additionally, the speed control circuit includes means responsive to unbalanced loads within the receptacle to prevent excessive vibrations during the spin cycle of the laundry machine. A switch is operated in response to an unbalanced condition above a certain level. The switch is connected to the speed control system in a manner such as to automatically control the rate of acceleration of the receptacle in coincidence with the rate of balancing of the receptacle by the automatic balancing system. Also, the switch is actuated by the balancing means to provide simultaneous dynamic balancing of the receptacle as well as speed control of the drive motor.

---

This is a division of application Ser. No. 348,459, filed Mar. 2, 1964, and naming Glen R. Severance as inventor and assignor to the assignee of the present application.

This invention relates to a laundry machine and more particularly to a compact electric motor drive system for rotating a clothes receptacle at different speeds including a low washing speed and a controlled high centrifuge speed with high efficiency and reliability, with protection against excessive vibrations due to unbalanced loads, and with comparatively inexpensive components.

Various types of electric motor drive systems have heretofore been provided for driving the clothes receptacles of automatic laundry machines. Some types have used a variable speed mechanical transmission between the receptacle and a constant speed electrical motor, usually an induction motor, to obtain a low washing speed and a high centrifuge speed. Such systems have been relatively cumbersome, inefficient and unreliable. Other types of systems have used a pole changing electric motor to obtain two or more speeds, which has resulted in increased efficiency but has had disadvantages including the cost of providing such a motor and the required associated pole switching circuitry, and inflexibility with respect to speed adjustments.

According to an important feature of this invention, a direct drive connection is provided between an electric motor and clothes receptacle, and the motor is connected to an AC supply line through an electrical speed control system wherein control currents of low magnitudes can be used to control the voltages applied to the motor to control the speed of operation thereof. With this system, it is possible to obtain high efficiency coupled with flexibility in obtaining the desired different speeds of operation. It is also possible to directly connect switches of a conventional cycle timer in the control portion of the speed control system since the required control currents are of low magnitudes.

Another important feature of the invention is in the use of saturable reactor means including core means of magnetic material and main and control windings on the control means, with the main winding means being connected between the AC supply and the electric motor. With this arrangement, the degree of magnetic saturation of the core means can be controlled with a relatively low current applied to the control winding means, to control the impedance of the main winding means and thereby control the voltage applied to the motor to control the speed of operation thereof.

A further important feature of the invention is in the use of a DC motor combined with rectifier means operative to convert the input AC to DC. The DC motor is highly advantageous in that its speed can be readily controlled by controlling the voltage applied thereto, while obtaining a high efficiency level at both low and high speeds of operation. In addition, the speed of operation of the DC motor is not limited by the frequency of the AC supply, and it is possible to obtain a quite high speed for the centrifuge operation, while at the same time obtaining a low speed, high torque operation for the washing operation.

A specific feature is in the connection of a field winding of the DC motor in series with the armature to obtain improved performance characteristics, particularly with regard to acceleration of the receptacle to operating speed in both the washing and centrifuge operations.

Another very important feature of the invention relates to the automatic control of the speed controlled system in response to unbalanced loads, to prevent excessive vibrations. In accordance with this feature, a switch may be operated in response to an unbalance above a certain level, and may be connected in the speed control system in a manner such as to automatically control the speed in response to the unbalance. This feature is particularly advantageous when incorporated in a machine having an automatic balancing system, in that the speed may be limited to give time for the balancing system to operate, after which the speed may be gradually increased toward the desired operating speed while not exceeding a predetermined vibration due to unbalance.

A specific feature of the invention is in the provision of a pair of unbalance sensing switches, respectively operated at different levels of vibration resulting from unbalance, one of the switches responding to a small unbalance vibration, being normally operative to keep the speed down until the clothes receptacle is balanced, and the other sensing switch responding to greater unbalance vibration to limit the speed down to a comparatively low value in response to an excessive vibration due to unbalance.

Additional features of the invention reside in comparatively simple circuit arrangements for obtaining the automatic speed control in a highly efficient and reliable manner. In particular, switches of a cycle timer are connected in circuit with a saturable reactor control winding and in circuit with resistors in a manner to obtain the desired operating speeds, and the automatic control of speed in response to unbalanced load. In one arrangement, the motor speed is approximately proportional to current through a saturable reactor control winding while in another arrangement, the speed is inversely proportional to the current through the control winding, a biasing field being applied in opposition to the field of the control winding. The biasing field may preferably be produced by a second control winding connected in series with the motor in a manner to obtain improved performance characteristics.

This invention contemplates other and more specific objects, features and advantages which will become more fully apparent from the following detailed description taken in conjunction with the accompanying drawings which illustrate preferred embodiments and in which.

Figure 1:
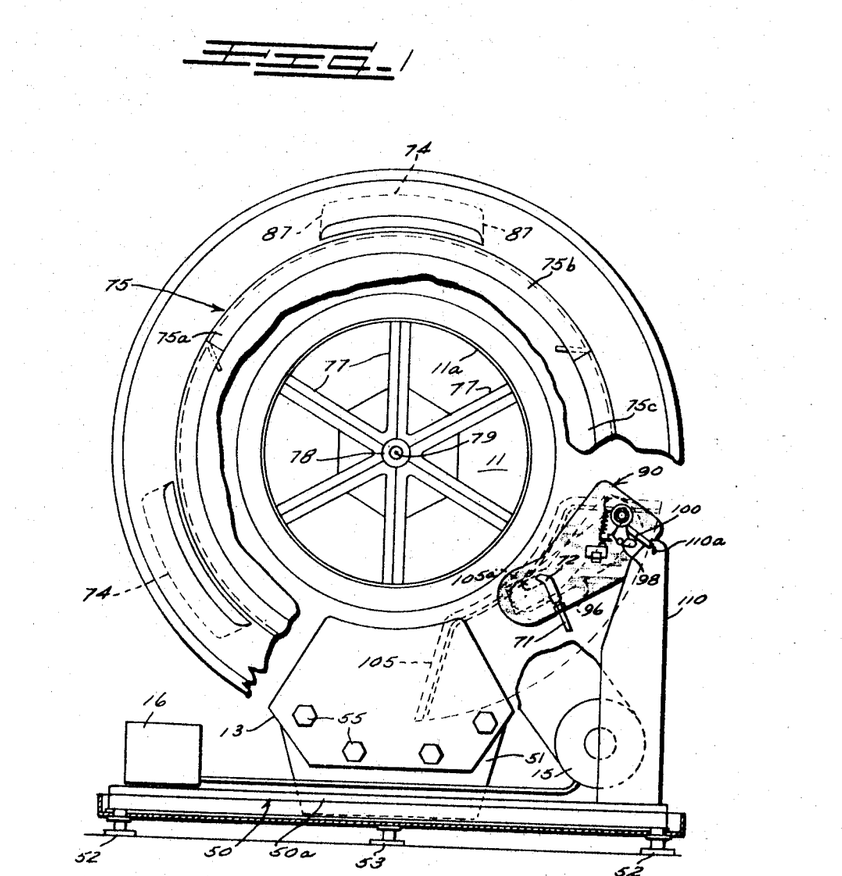
FIGURE 1 is a front elevational view of a laundry machine incorporating the principles of the present invention, but with the outer cabinet removed and with parts broken away and with other parts removed for clarity.
Figure 2:
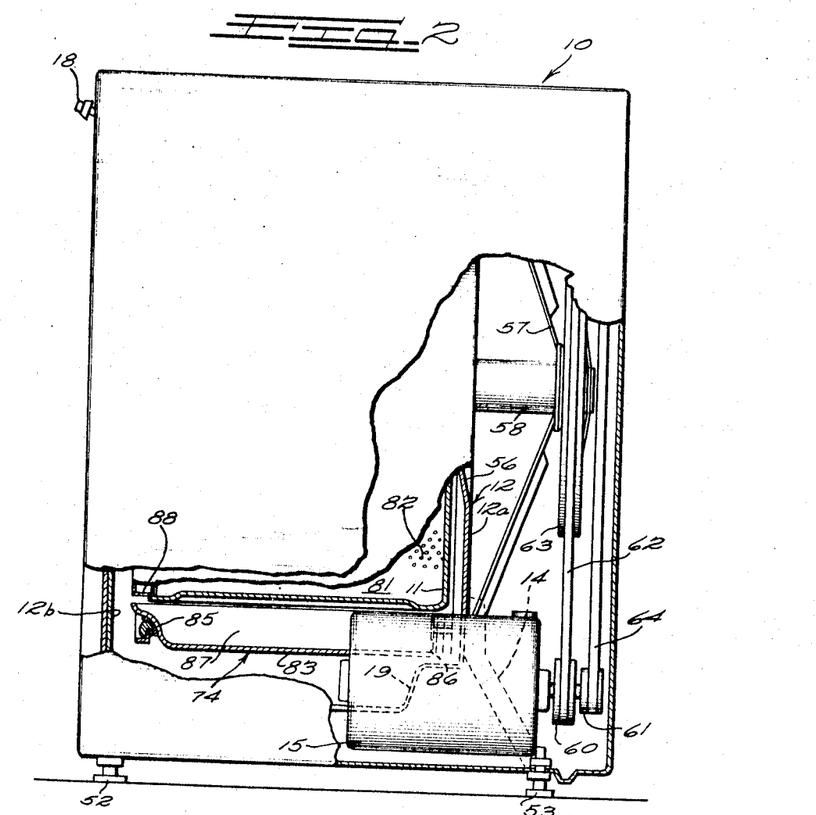
FIGURE 2 is a side elevational view of the laundry machine of FIGURE 1, with portions of the cabinet structure removed for clarity of illustration.

Referring to FIGURES 1 and 2, reference numeral 10 generally designates a laundry washer-dryer combination which will operate generally in the same manner common in the art of washer-dryer combinations. The washer-dryer combination described herein is of a basic horizontal type having a drum 11 mounted inside a fixed casing 12, the casing 12 in turn being mounted between a pair of support members 13 and 14. The drum 11 is rotated by a DC drive motor 15, which is controlled by a speed control unit 16 which is controlled by a sequence timer 18 and is also controlled in response to excessive vibrations due to unbalanced loads, as described in detail hereinbelow.

Figure 3:
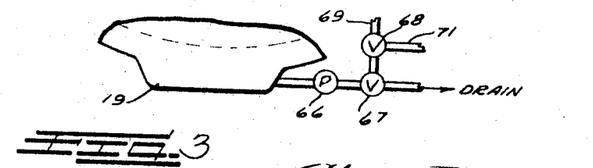
FIGURE 3 is a diagrammatic representation of certain hydraulic circuitry incorporated in the illustrated machine.
Figure 5:
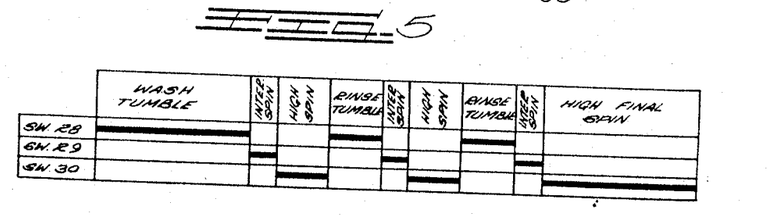
FIGURE 5 is a graphical representation of the sequence of operation of the timing motor and associated switches used in the illustrated machine, the shaded area of which indicates when the switches are closed.

In a typical operation, the operator will load the clothes to be laundered through an access opening defined by rim 11a into the drum 11 and upon initiation of a preselected program, the drum 11 and the casing 12 will be charged with a supply of water. Following the washing operation, the laundry liquid will be partially drained from the casing 12 by way of the sump 19 in the lower part of the casing 12 (FIGURE 3), into a household drain. The clothes within the drum 11 are then subjected to an extraction operation, followed by rinsing and a subsequent extraction operation, which portions of the washing cycle may be repeated as often as may be desired in accordance with a preset program such as illustrated in FIGURE 5. A volume of water will be retained in the sump 19 after the wash and rinse operations at a level below the bottom of the drum 11 to be used in dynamic balancing of the rotating drum during the extraction operations which will be explained in more detail hereinbelow. After the final extraction operation, the machine either continues to a drying period involving operation of the dry system and including addition of heat of vaporization to the stream of ventilating air circulated through the treatment zone, or the clothes being laundered may be removed from the machine for line drying.

Figure 4:
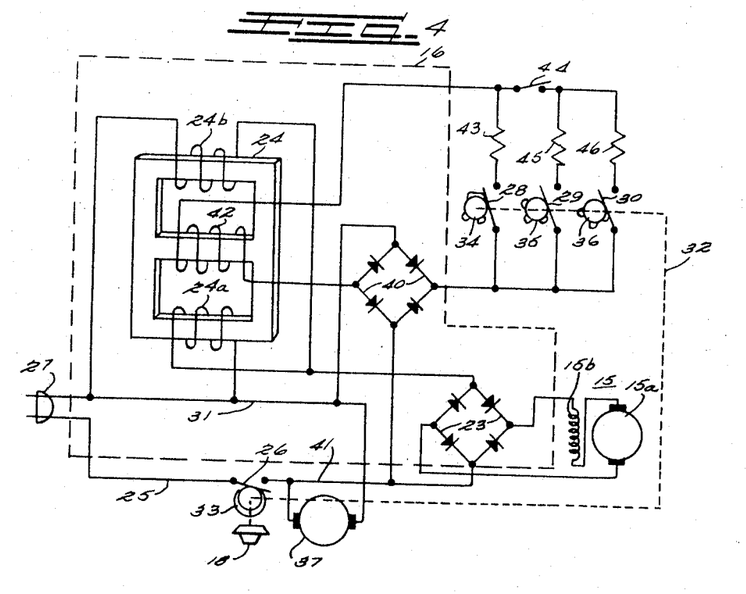
FIGURE 4 is an electrical schematic diagram indicating the wiring connections and electrical components used in the illustrated machine.

FIGURE 4 shows the interconnection of the motor 15, the speed control unit 16 and the timer 18. The drive motor 15 is a DC motor having an armature 15a and a field 15b connected in series to the DC side of a bridge rectifier 23, the bridge rectifier 23 having one AC terminal connected to terminals of main windings 24a and 24b of a saturable reactor 24, and the other AC terminal connected to line 25 through switch 26 of the timer 18, the other terminals of the saturable reactor 24 being connected to a power plug 27. Switches 26, 28, 29 and 30 of the timer 18 are connected to a common shaft indicated by the dotted line 32, the shaft having mounted on it a set of sequence cams 33, 34, 35 and 36 to operate the above-mentioned switches, also the shaft 32 being connected to a timing motor 37 which controls the rotation of the sequence cams 33, 34, 35 and 36 which in turn control the operation of the switches 26, 28, 29 and 30. A bridge rectifier 40 has its AC terminals connected between lines 31 and 41. The bridge rectifier 40 has one DC terminal connected to one lead of the control winding 42 of the saturable reactor 24, and has its other DC terminal connected to the switches 28, 29 and 30. The control winding 42 of the saturable reactor 24 has its other lead connected to the resistor 43 and an unbalance sensing switch 44. Resistors 45 and 46 are also connected to unbalance sensing switch 44 and switches 29 and 30 respectively.

In operation, the control knob 18 is operated so as to close the switch 26. This function applies AC power to the timing motor 37 which will control the sequence of the washing cycle, rinsing cycle and spinning cycle as represented by the graph in FIGURE 5 of the washing cycle. Also when the switch 26 is closed, power is applied to the bridge rectifier 40 and to the bridge rectifier 23 through the saturable reactor 24. The main windings 24a and 24b of the saturable reactor 24 and the bridge rectifier 23 are connected in series, and present an effective impedance which is controlled by the control voltage applied. That is, when little or no control voltage is applied to winding 42 the saturable reactor offers maximum impedance in series with the bridge rectifier 23 thereby applying minimum DC voltage to the motor 15. As the control voltage increases on the control winding 42, the iron core of the saturable reactor 24 becomes more saturated, thereby offering less impedance in series with the bridge rectifier 23, which in turn applies a higher DC voltage to the drive motor 15. It may be noted that the main windings 24a and 24b are effectively connected in phase opposition with respect to the control winding 42 to minimize the induction of AC currents in the control winding circuit.

The control winding 42 of the saturable reactor 24 is connected to the control resistors 43, 45 and 46 through the sequence switches 28, 29 and 30 to bridge rectifier 40. When switch 28 is closed, resistor 43 limits the voltage applied to the control winding 42 of the saturable reactor 24 to a low value. This allows the drive motor 15 to rotate at a minimum speed suitable for the wash and tumble operation of the machine. At a predetermined time, depending on the configuration of cams 34, 35 and 36, the switch 28 will open and switch 29 will close, applying a higher control current to control winding 42 through resistor 45, which is of a lower value than resistor 43, to the control winding 42 of the saturable reactor 24. This allows the drive motor 15 to rotate at a faster speed suitable for intermediate spin of the washing machine. At a second predetermined time switch 29 will open and switch 30 will close, applying a still higher control current through resistor 46, which is of a lower value than resistor 45, to the control winding 42 of the saturable reactor 24. This allows the motor 25 to rotate at a faster speed, which is required for high spin operation of the washing machine. Although resistors 43, 45 and 46 are shown as fixed value resistors, they could well be of the adjustable design, whereby the speed of the washing machine could be adjusted.

If the clothes in the washing machine are generally gathered in one location, the machine will vibrate due to the off balance which is caused by the bunch of clothes being on one side of the drum 11. Because of this off balance, unbalance sensing switch 44 will open and close during the intermediate and high speed spin of the washing machine. The effective resistance thus introduced into the control circuit will be a function of the relative time in which switch 44 is open compared to the time it is closed. This has the effect of introducing a resistance in the circuit which is variable in response to the degree of vibration due to unbalance of the rotating drum 11. A balancing mechanism, FIGURES 6 and 7, which will be described later, also is operated due to the off balance of the machine. As the machine becomes automatically balanced, the oscillatory motion of the balancing switch 44 becomes less and the drive motor 15 will rotate at a faster speed.

With regard to the mechanical construction of the washer-dryer combination 10, it consists of a rigid base structure shown generally at 50, and which comprises a channel member 50a to which is firmly secured a plate 51. The base structure or frame 50 further may be observed from FIGURES 1 and 2 to include front legs 52 bolted to the channel member 50a, and a single rear leg 53 bolted to the member 14 which is welded or otherwise secured to the rear wall 12a of the casing 12. The casing 12 is connected and supported on the base frame 50 by the front wall support plate member 13 which is integrated with the front wall 12b of the casing 12 by welding or similar techniques. The plate member 13 is further securely fastened to the plate member 51 on the base frame 50, as by bolt means or the like 55.

The rear wall 12a of the casing 12 has a centrally apertured embossed portion 56 cooperable with a support spider 57 connected in firm assembly with the rear wall 12a to rigidly mount a bearing assembly generally designated at 58 in which a journalled shaft means (not shown) is connected for corotation with a perforated drum or cylinder 11 rotatable within the casing 12. It is to be noted that the connection provided by the parts 51 and 13 between the base frame 50 and casing 12 are of rigid construction, however, there is sufficient yieldability in the support structure so that a very small movement in the casing 12 relative to the base frame 50 may occur. The connections afforded by the connections of the plate members 51 and 13 to the channel members 50a and the connections of the part 14 to the casing 12 are sufficiently rigid to confine the casing 12 for oscillatory movement about an axis positioned parallel to and located between the horizontal rotational axis of the drum 11 and the base 50. The machine exemplified in the drawings shows such allowable arcuate movement approximately 0.010 inch from its normal centered positioned as measured from an approximate 16 inch lever arm from the base.

The DC electric drive motor 15 is mounted on the casing 12 and is provided with a power take-off shaft connected with pulleys 60 and 61. Pulley 60 drives a pulley belt 62 which drives a pulley reel 63 to rotate the drum 11. The pulley 61 drives a pulley belt 64 connected with blower means (not shown) to circulate heated drying air to the drum 11.

Machine 10 is further equipped with a conventional water inlet valve arrangement (not shown) as well as the sump 19 receiving fluid in the washing, rinsing and extraction operation. Sump 19 communicates with pump 66 which in turn is connected to a two-way valve 67 which leads either to the drain for pump out operations or to a second two-way valve 68 which is provided with one conduit 69 for recirculating liquid through drum 11 during the washing operation by way of a recirculation nozzle (not shown) and a second conduit 71 leading to nozzle 72 (FIGURE 6) for recirculating liquid through nozzle opening 72b (FIGURE 7) during the extraction operation, which balancing fluid is supplied to the fluid receiving pockets 74 by way of the receptive collector segments 75a–c communicating with the pockets 74. The sequential timer or controller 18, which may be of conventional construction, regulates the operation of valves 67 and 68 throughout a program sequence.

As earlier indicated, the speed control system of this invention may be employed in connection with various types of centrifugal extraction systems. However, one particularly advantageous system is shown in the application drawings in order to clearly illustrate the numerous novel results obtained by the instant speed control system. In this connection, it is to be observed from FIGURE 1 that the drum 11 has formed along its back wall 11a a plurality of radially extending and angularly spaced strengthening ribs 77. The center of the back wall of the drum 11 is connected as at 78 to shaft means 79 journalled in the bearing assembly 58. The outer peripheral wall of the drum 11 is formed by a foraminous wrapper 81 (FIGURE 2) and is particularly characterized by a plurality of openings 82 through which liquid may escape from the interior of the drum 11 into the casing 12. The drum periphery is further provided at a plurality of circumferentially spaced locations therealong with recess means provided to accommodate mounting therein of a liquid balancing receptacle indicated generally in FIGURE 2 at 74. Each receptacle 74 comprises a generally trough-shaped tray member having a bottom 83, axially spaced end walls 85 and 86, and a pair of spaced side walls 87. Each receptacle 74 is provided with an inlet collector segment 75a, 75b and 75c (FIGURE 1) which may be seen in FIGURE 2 to be of generally U-shaped configuration and each provided with an opening 88 through which all of the fluid within the inlet segment is discharged radially outwardly into a particular receptacle as required for counterbalancing purposes. In the exemplary disclosure illustrated, there are three receptacles 74, and accordingly, each segment 75a–c may, if desired, extend through 120° of arc on the front wall of the drum 11. The inlet segments, generally designated by numeral 75, are attached in firm assembly as by welding or the like to the drum front wall in registry with the liquid supply means provided to introduce balancing fluid thereinto.

In order to control the introduction of balancing fluid into the receptacles 74 by way of the inlet segments 75a–c, there is utilized as a controlling variable, a mechanical signal manifested as a relatively small oscillatory movement between the casing 12 and a relatively stationary reference means associated with the base structure. A balance housing, designated generally in FIGURES 6 and 7 by the numeral 90, comprises a plate-like member attached by fastening means 97 to the front wall 12b of the casing 12.

The balance housing 90 is passaged at 90a (FIGURE 7) adjacent its upper end and firmly received in the passage 90a is a sleeve member 92 having a generally D-shaped opening 92a formed therein by a notch extending approximately half way through the sleeve member 92. Journalled in bearings 93 within the sleeve member 92 is a rod or shaft means 94 having a notch forming a flat portion and defining a generally D-shaped recess 94a matching the similarly shaped opening 92a in the sleeve member 92. The shaft means 94 threadably receives at one end screw means 95 to effect attachment of a flag stream interrupter or deflector member 96.

Figures 6, 7, 9:
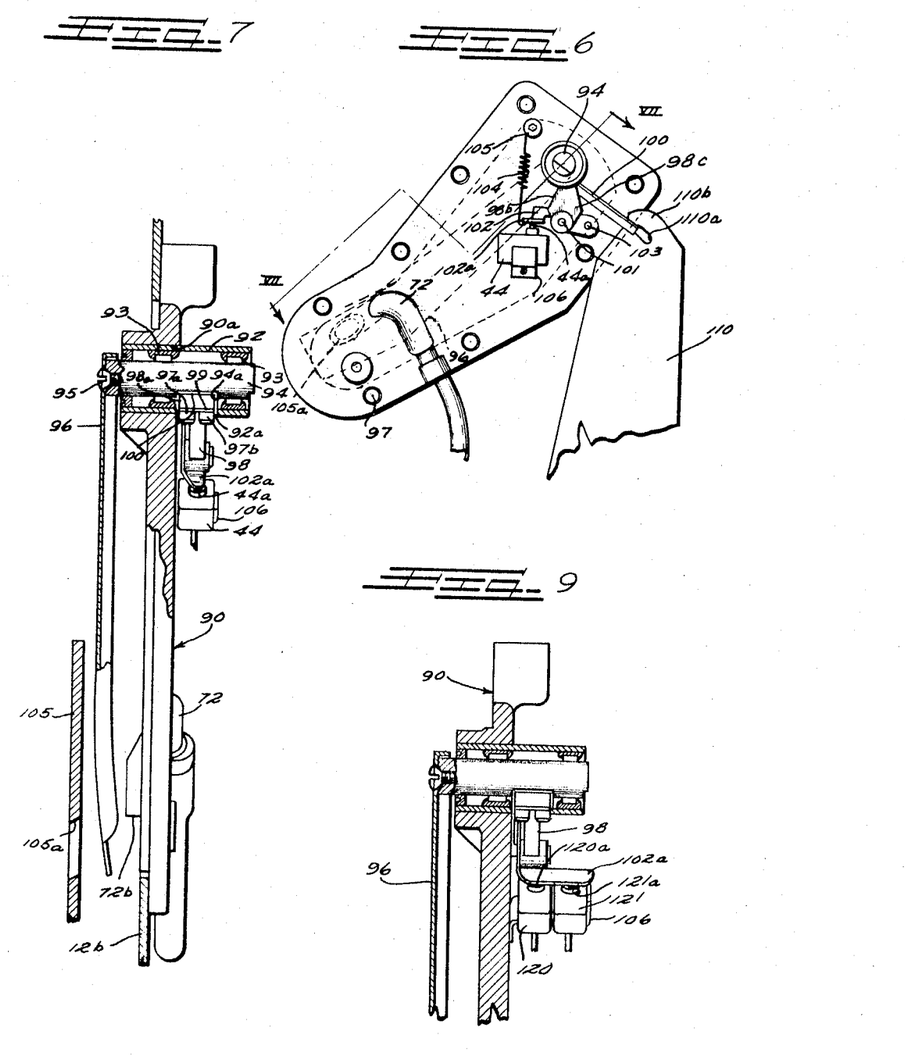
FIGURE 6 is an enlarged fragmentary view constituting a layout of a sensing mechanism which may be employed to initiate a load counterbalancing function and an electric drive motor speed limiting switch function.
FIGURE 7 is a sectional view taken substantially along the lines VII—VII of FIGURE 6 and further illustrating the sensing apparatus of this invention.
FIGURE 9 is a view similar to FIGURE 7, showing the mounting of a pair of unbalance sensing switches for the alternate embodiment of speed control system of FIGURE 8.

The shaft means 94 is radially tapped and threaded on the flat portion of the D-shaped recess 94a to receive therein screw means 97a and 97b to eccentrically mount (on shaft means 94) cam means 98, washer means 99 and a relatively thin leaf spring member 100 directly adjacent flat portion 94a. As appears in the drawings, attaching portion 98a of the cam member 98, the washer means 99 and one end of the leaf spring member 100 are essentially entirely contained in the recessed portion 94a of the shaft means 94 and the passage 92a of the sleeve member 92.

The cam member 98 which corotates with the shaft 94 in a limited arcuate motion is provided with a cam lobes 98b and 98c engaging a roller-like follower means 101 (FIGURE 6) rotatably carried by an arm member 102 pivotally connected at 103 to the balance housing 90. The end of the arm member 102 extends beyond the follower means 101 and has a flange portion 102a formed thereon to which is connected spring means 104 which in turn is connected to a stationary anchor member 105 connected to the balance housing 90. The balance housing 90 further mounts the unbalance sensing switch 44 by a clamp 106, the unbalance sensing switch 44 having a stem portion 44a located for actuation by the flange portion 102a on the arm member 102. In operation, the unbalance sensing switch 44 is normally closed which will allow the motor 15 to attain its maximum speed. However, if an off balance condition exists, the oscillatory motion of the casing 12 will cause the shaft 94, of the balance housing 90, to flex radially thereby causing cam 98 to operate arm 102. The arm 102, being in close relation with the actuating lower of the unbalance sensing switch 44, will operate the unbalance sensing switch to control the rate of the motor 15, the opening and closing of switch 44 constitutes the effect of a variable resistance as previously described.

The leaf spring reaction member 100 (FIGURES 1 and 6) is clampingly engaged at its opposite end by stationary or immovable structure 110 during drum rotation so that if the drum vibrates by reason of an off balance load therein, the shaft 94 is slightly rotated to pivot the deflector or stream interrupter member 96 out of blocking relation with nozzle means 72 to permit the discharge of counterbalancing fluid from the nozzle opening into the proper inlet segments 75a–c diametrically opposed to the off balance load. In this regard, it is to be observed that there is provided a splash housing 105 mounted on the casing front wall 12b between the casing 12 and drum 11. The splash housing has formed therein a slotted opening 105a in registry with the outlet of the nozzle 72.

The clamping means for the leaf reaction member 100 comprises a stationary or immovable frame member 110 erected from the channel member 50a of the base frame structure 50, and attached rigidly thereto by welding or other suitable modes of securement. The stationary reaction member 110 is notched at 110a to provide a claw portion 110b clampingly engaging one end of the leaf spring reaction member 100.

In summary, it can be seen that the frame member 110 serves as a stationary abutment or reaction member to which one end of the leaf spring member 100 is attached, the other end of the latter member 100 being attached to the flat on the shaft 94 to which the flag 96 and cam 98 are also rigidly connected. Oscillation of the casing 12 during rotation of unbalanced loads in the machine places leaf spring 100 alternately in tension and compression, and the resulting flexing of the eccentrically connected spring member 100 oscillates flag member 96 to control the water balancing and cam 98 to actuate arm 102 thereby controlling the drive motor speed during the fluid extraction cycle of the machine.

Figure 8:
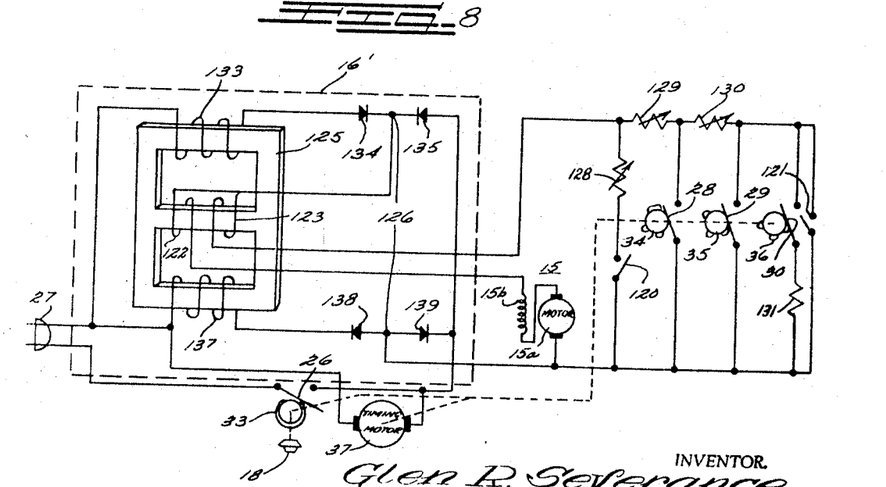
FIGURE 8 is an electrical schematic diagram of an alternate embodiment of the speed control system constructed according to the invention.

A modified form of speed control circuit 16 is shown in FIGURE 8, wherein a pair of unbalance sensing switches 120 and 121 which are normally open are used to control the speed of the motor 15, and wherein a pair of control windings 122 and 123 of a saturable reactor 125 are connected in such a manner as to provide a feedback arrangement to the saturable reactor 125 depending on motor load. As shown in FIGURE 9, the unbalance sensing switches 120 and 121 are mounted on the balance housing 90 in such a manner that the perpendicular distance between their actuators 120a and 121a and the arm flange 102a are different. Therefore, it requires a different amount of off balance to actuate each switch. The unbalance sensing switch 120 is actuated by a large off balance, while unbalance sensing switch 121 is actuated by a slight off balance. The control winding 122 is connected in series with the motor 15 which is connected to a common DC source 126, while control winding 123 is connected in series with an arrangement of control resistors which are also connected to the common DC source 126. The control windings 122 and 123 are wound in such a manner that they produce opposing magnetic fields when current passes through them simultaneously.

In operation, the current passing through motor 15 also passes through the control winding 122. This provides a magnetic field suitable to saturate the saturable reactor 125 and causes the motor 15 to run at high speed. A control voltage is applied to the control winding 123 which will produce a magnetic field in the opposite direction. This will place a limiting saturation point on the saturable reactor 125, thereby limiting the maximum speed of the motor 15.

The control winding 123 is connected through the resistor 128 to the unbalance sensing switch 120 and is also connected through a resistor 129 to the switch 28 and a resistor 130. The resistor 130 is connected to switches 29 and 30 and unbalance sensing switch 121, the switch 30 being connected to a resistor 131. A reactance or main winding 133 is provided on the core of the saturable reactor 125 with one lead thereof being connected to the power plug 27, the other lead being connected to the anode of a rectifier 134. The cathode of the rectifier 134 is connected to the cathode of a rectifier 135 to form the positive terminal of the DC source 126. A second reactance or main winding 137 on the core of the saturable reactor has one lead connected to the power plug 27 and its other lead connected to the cathode of a rectifier 138. The anode of the rectifier 138 is connected to the anode of a rectifier 139 to form the negative terminal of the DC source 126. The anode of the rectifier 135 and the cathode of rectifier 139 are connected to switch 26.

The saturable reactor 125 and rectifier 134, 135, 138 and 139 operate in a manner common in the art of saturable reactors, to control the DC voltage of the source 126 in accordance with the magnetic flux developed by the control windings 122 and 123.

During the wash and tumble operation, switch 26 is closed allowing a control current to flow through resistor 129 into the control winding 123. At a predetermined time, when the wash and tumble operation stops and an intermediate spin starts, switch 28 will open and switch 29 will close, causing a lower control current than during the tumble wash operation to flow through the two resistors 129 and 130 into the control winding 123 thereby increasing the speed of the drive motor 15 for intermediate spin. As a second predetermined time, when the intermediate spin stops and the high spin starts, switch 29 will open and switch 30 will close causing a lower control current than during the intermediate spin to flow through resistors 129, 130 and 131 into the control winding 123 thereby further increasing the speed of the drive motor 15 for high spin.

As the wash cycle changes from intermediate spin to high spin the random distribution of materials in the drum may result in a dynamic unbalance of rotating drum. A slight off balance will cause the casing 12 to oscillate and operate the arm 102 in a manner similar to that mentioned above. The unbalance sensing switch 121 is actuated by the arm flange 102a thus closing and opening intermittently at the frequency of the rotating drum 11 causing the speed of the motor 15 to be controlled between high spin and intermediate spin in response to the oscillation of the casing 12. The drum speed is limited by the actuation of sensing swith 121 until the off balance is corrected by the balancing control 90. If the off balance condition is great the casing 12 will oscillate more violently, causing the arm flange 102a to actuate unbalance sensing switch 120. The actuation of switch 120 causes resistor 128 to be placed alternately in and out of the circuit and an effective control current will flow in the control winding 123 governed by the relative time the switch 120 is opened or closed. The actuation of switch 120 causes a more pronounced speed limiting effect on the drive means since resistor 128 has less resistance than resistors 129 and 130 have when located in series; therefore, when a large unbalance is detected, the speed of the drum 11 is controlled more rapidly to prevent possible damage to the machine or surrounding structure. This action will control the speed of the motor 15 at the same time the balancing control 90 is correcting the off balance condition.

A smoother and better controlled acceleration can be obtained by the use of two unbalance sensing switches 120 and 121. The unbalance sensing switch 120 is operated during the severe off balance of the washing machine and will gradually decrease its operation until the off balance is slight. This slight off balance wil continue to actuate unbalance sensing switch 121 and gradually decrease its operation as the slight off balance is corrected. When final correction is made the machine runs with switches 120 and 121 both open.

The embodiments of the invention in which an exclusive property or privilege is claimed are defined as follows:

1. In a laundry machine including a clothes receptacle adapted for rotation at a high centrifuge speed, support means for journaling said receptacle for rotation, an electric motor for rotating said receptacle, speed control means for connection to an AC source and arranged to supply a controllable voltage to said motor to control the speed of operation thereof, switch means responsive to vibration of said support means due to rotation of unbalanced loads in said receptacle, and means electrically interconnecting said switch means and said speed control means for automatically controlling the speed of said motor in response to a predetermined degree of unbalance of said receptacle.

2. In a laundry machine including a clothes receptacle adapted for rotation at a high centrifuge speed, support means for journaling said receptacle for rotation, an electric motor for rotating said receptacle, means responsive to vibration of said support means for automatically balancing said receptacle, speed control means for connection to an AC source and arranged to supply a controllable voltage to said motor to control the speed of operation thereof, switch means responsive to vibration of said support means due to rotation of unbalanced loads in said receptacle, and means electrically interconnecting said switch means and said speed control means for automatically controlling the speed of said motor in response to a certain degree of unbalance of said receptacle and for increasing the speed of said motor after balancing of said receptacle by said automatic balancing means.

3. In a laundry machine including a clothes receptacle adapaed for rotation at a high centrifuge speed, support means for journaling said receptacle for rotation, an electric motor for rotating said receptacle, speed control means for connection to an AC source and arranged to supply a controllable voltage to said motor to control the speed of operation thereof, first switch means responsive to a first predetermined degree of vibration of said support means due to rotation of unbalanced loads in said receptacle, second switch means responsive to a second predetermined degree of vibration of said support means larger than said first predetermined degree of vibration, and means electrically connecting said first and second switch means and said speed control means for automatically controlling the speed of said motor in response to operation of said first switch means and for automatically further controlling the speed of said motor in response to operation of said second switch means.

4. A laundry machine having an operating cycle comprising a washing portion and a centrifuge portion including
    a clothes receptacle adapted for rotation at a low washing speed and a high centrifuge speed,
    support means for journaling said receptacle for rotation,
    an electric motor for rotating said receptacle,
    speed control means for connection to an AC voltage source and arranged to supply a controllable voltage to said motor to control the speed of operation thereof,
    cycle timer means connected with said speed control means to cause application of low and high voltages to said electric motor during respective washing and centrifuge portions of said operating cycle,
    switch means responsive to vibration of said support means due to rotation of unbalanced loads in said receptacle,
    and means electrically interconnecting said switch means and said speed control means for automatically controlling the speed of said motor in response to an unbalanced condition of said receptacle.

5. The apparatus of claim 4 wherein said cycle timer means includes a timer controlled switch for rendering said switch means responsive to the vibration of said support means ineffective to control the speed of said motor during the washing portion of said operating cycle.

6. The apparatus of claim 4 wherein said cycle timer means includes a timer controlled switch and a resistor electrically connected and operable during the centrifuge portion of said operating cycle to cause application of high voltage to said motor, said switch means responsive to the vibration of said support means electrically connected with said timer controlled switch and said resistor and operable to reduce the voltage to said motor by varying the effective resistance of said resistor in response to an unbalanced condition of said receptacle.

7. The apparatus of claim 4 wherein said switch means includes a first switch means responsive to a first predetermined degree of vibration of said support means due to rotation of unbalanced loads in said receptacle, and second switch means responsive to a second predetermined degree of vibration of said support means larger than said first predetermined degree of vibration, said first and second switch means electrically connected to said speed control means for automatically controlling the speed of said motor in response to operation of said first switch means and for further controlling the speed of said motor in response to operation of said second switch means.

8. The apparatus of claim 4 including means responsive to vibration of said support means for automatically balancing said receptacle, said switch means operable to control the speed of said motor until balancing is accomplished by said automatic balancing means.

9. In a laundry machine including a clothes receptacle adapted for rotation at a high centrifugal speed, support means for journaling said receptacle for rotation, a direct current electric motor for rotating said receptacle, speed control means for connection to an AC source and arranged to supply a controllable direct current voltage to said motor to control the speed of operation thereof, switch means responsive to vibration of said support means due to rotation of unbalanced loads in said receptacle, balancing means responsive to vibration of said support means for automatically balancing said receptacle, and means electrically interconnecting said switch means and said speed control means for automatically controlling the speed of said motor in response to a predetermined degree of unbalance of said receptacle, and for automatically increasing the speed of said motor as said receptacle becomes balanced by said balancing means.

10. A laundry machine including a clothes receptacle adapted for rotation at a high centrifugal speed, support means for journaling said receptacle for rotation, an electric motor for rotating said receptacle, balancing means responsive to vibration of said support means for automatically balancing said receptacle, speed control means for connection to an AC source and arranged to supply controllable voltage to said motor to control the speed of operation thereof, switch means actuated by said balancing means in response to vibration of said support means due to rotation of unbalanced loads in said receptacle, and means electrically interconnecting said switch means and said speed control means for automatically controlling the speed of said motor in response to a certain degree of unbalance of said receptacle and for increasing the speed of said motor after balancing of said receptacle by said automatic balancing means.

11. In a laundry machine including a clothes receptacle adapted for rotation at a high centrifugal speed, support means for journaling said receptacle for rotation, an electric motor for rotating said receptacle, balancing means responsive to vibration of said support means for automatically balancing said receptacle, speed control means for connection to an AC source and arranged to supply a controllable voltage to said motor to control the speed of operation thereof, first switch means actuated by said balancing means in response to a first predetermined degree of vibration of said support means due to rotation of unbalanced loads in said receptacle, second switch means actuated by said balancing means in response to a second predetermined degree of vibration of said support means larger than said first predetermined degree of vibration, and means electrically connecting said first and second switch means and said speed control means for automatically controlling the speed of said motor in response to operation of said first switch means for automatically further controlling the speed of said motor in response to operation of said second switch means.

12. A laundry machine having an operating cycle comprising a washing portion and a centrifugal portion including: a clothes receptacle adapted for rotation at a low washing speed and a high centrifugal speed; support means for journaling said receptacle for rotation; an electric motor for rotating said receptacle; balancing means responsive to vibration of said support means for automatically balancing said receptacle; speed control means for connection to an AC voltage source and arranged to supply a controllable voltage to said motor to control the speed of operation thereof; cycle timer means connected to said speed control means to cause application of low and high voltages to said electric motor during respective washing and centrifugal portions of said operating cycle; switch means actuated by said balancing means in response to vibration of said support means due to rotation of unbalanced loads in said receptacle; and means electrically interconnecting said switch means and said speed control means for automatically controlling the speed of said motor in response to unbalanced conditions of said receptacle.

13. The apparatus of claim 12 wherein said timer means includes a timer controlled switch for rendering said switch means responsive to the vibration of said support means ineffective to control the speed of said motor during the washing portion of said operating cycle.

14. The apparatus of claim 12 wherein said cycle timer means includes a timer controlled switch and a resistor electrically connected and operable during the centrifugal portion of said operating cycle to cause application of high voltage to said motor, said switch means actuated by said balancing means and electrically connected with said timer controlled switch and said resistor and operable to reduce the voltage of said motor by varying the effective resistance of said resistor in response to an unbalanced condition in said receptacle.

15. The apparatus of claim 12 wherein said switch means includes a first means responsive to a first predetermined degree of vibration of said support means due to rotation of unbalanced loads in said receptacle, and second switch means responsive to a second predetermined degree of vibration of said support means larger than said first predetermined degree of vibration, said first and second switch means electrically connected to said speed control means for automatically controlling the speed of said motor in response to the operation of said first switch means and for further controlling the speed of said motor in response to the operation of said second switch means.

16. A laundry machine comprising: a machine housing and a clothes receptacle mounted for rotation within the housing, a DC motor directly connected for rotating said receptacle and for having a constant speed ratio therewith, a saturable core reactor having a control winding and an output winding, an output circuit including said output winding having a first terminal for being connected to a power source and a second terminal connected to said DC motor, a timing motor and a plurality of resistors each having a series connected switch operated by said timing motor, an input circuit including said control winding having a first terminal for being connected to a power source and a second terminal connected to one terminal of each of said resistors, each of said series connected switches being closed sequentially by said timing motor to complete said input circuit with said associated resistor, and said timing motor operating said switches to incorporate one of said resistors to accommodate the differing requirements of washing and spinning cycles of the clothes receptacle, balancing means responsive to vibration of said clothes receptacle for automatically balancing said receptacle, and means in circuit with at least one of said plurality of resistors and responsive to said balancing means to control the speed of rotation of said receptacle during an unbalanced condition and for automatically increasing the speed of said receptacle becomes balanced by said balancing means.

17. A laundry machine as described in claim 16 wherein a feedback winding is provided on said saturable core reactor and wherein said feedback winding is series connected with said output winding and said motor, said feedback winding being wound on said saturable core reactor to oppose increases in flux within said output winding and maintain the speed substantially constant for a corresponding operating position of said timing motor.

18. A laundry machine as described in claim 16 wherein an unbalance switch is provided in said control circuit for effectively increasing the resistance of said control circuit and decreasing the current therein in response to vibrations of said clothes receptacle, whereby the speed of said DC motor is effectively controlled by said unbalance or vibration switch.

19. In an automatic washing machine the combination of, a rotatable tub, a water container enclosing said tub, means including an electrical motor for driving said rotatable tub within said water container, means including a framework for supporting said water container and rotatable tub, circuit means for electrically connecting said motor means to a source of power, said circuit means including transducer vibration sensing means fixedly secured to said frame work out of operative contact with either said water container or said rotatable tub, said vibration sensing means being responsive to a predetermined range of vibrations induced in said framework for conditioning said circuit means to continuously cut back the power input to said motor means as an inverse function of the amplitude of sensed vibrations between a predetermined minimum value and a predetermined maximum value whereby tub acceleration is controlled to prevent framework vibrations in excess of said predetermined maximum value.

20. In a cleaning device the combination of, a rotatable cleaning cylinder, electric motor means for driving said rotatable cylinder, line switch means for controlling power input to said motor means, and vibrations responsive means for operating said line switch means in response to a predetermined range of vibrations, said vibration responsive means including means for directly and continuously conditioning said line switch means to continuously cut back power input to said motor means as an inverse function of the sensed amplitude of vibration.

21. A vibration control system for association with a centrifugal device having electrical motor drive means comprising, line switch means for controlling power input to said motor means, vibration sensing means for directly operating said line switch means in response to a predetermined vibration, said vibration sensing means including means for continuously opening and closing said line switch at a rate dependent on the sensed vibrations to limit power input to said electric motor drive means as an inverse function of the sensed amplitude of vibration.

22. In a vibration control system for association with a centrifugal device having electric motor drive means the combination comprising, line switch means for controlling power input to said motor drive means including input, output and control terminals, circuit means including vibration sensing means directly electrically connected to said line switch means for varying voltage across the output and control terminals of said line switch means for regulating power input to a centrifugal device motor drive means, said vibration sensing means including means responsive to sensed vibrations for continuously varying the voltage across said output and control terminals of said line switch at a rate dependent on said sensed vibration to continuously cut back power input to said motor means as an inverse function of the sensed amplitude of vibration.

References Cited

UNITED STATES PATENTS

| | | | |
|---|---|---|---|
| 3,049,021 | 8/1962 | Neyhause et al. | 68—24 X |
| 3,226,960 | 1/1966 | Mellinger | 210—144 X |
| 3,268,791 | 8/1966 | Burns et al. | 68—24 X |

WILLIAM I. PRICE, *Primary Examiner.*

U.S. Cl. X.R.

68—24; 210—144; 318—460